L. SCOFIELD.
CORN-PLANTER.

No. 172,280. Patented Jan. 18, 1876.

4 Sheets—Sheet 1.

Witnesses:
Granville Lewis
M. Church

Inventor
Levi Scofield
By Hill & Ellsworth
His Attys.

4 Sheets—Sheet 2.
L. SCOFIELD.
CORN-PLANTER.
No. 172,280. Patented Jan. 18, 1876.
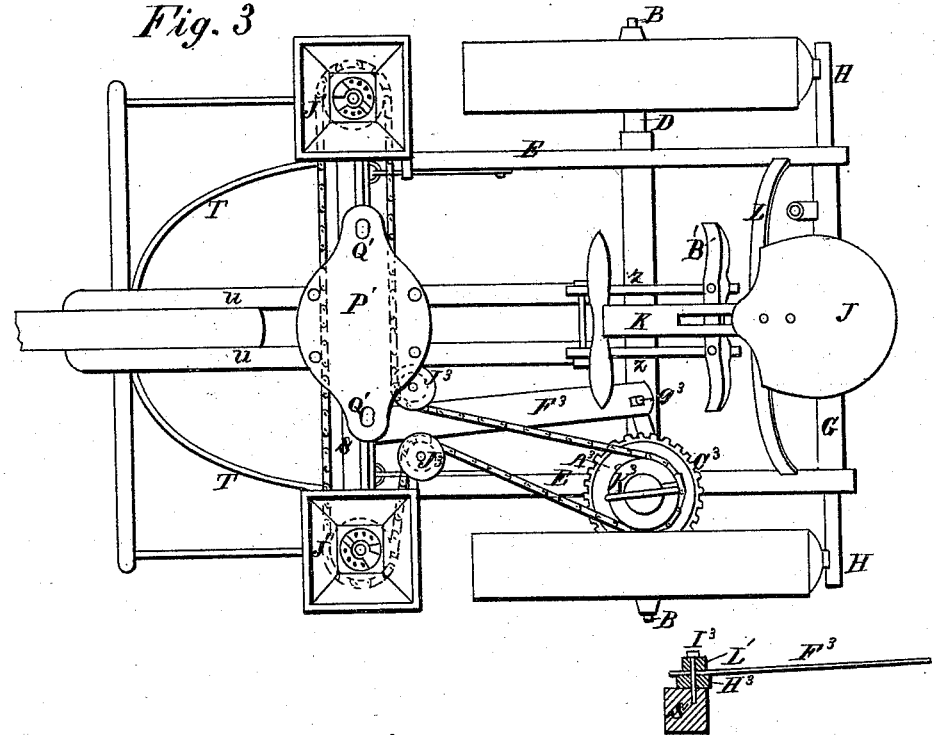
Fig. 3
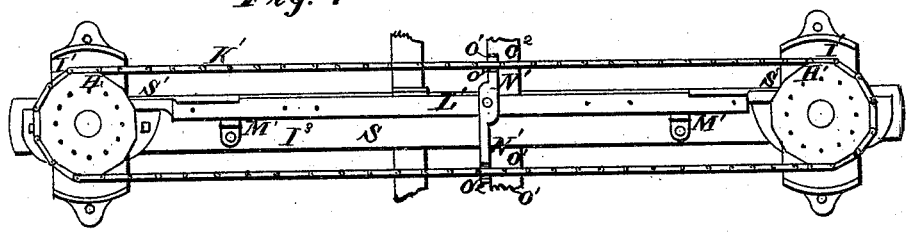
Fig. 4
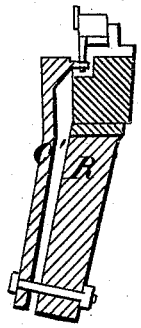
Fig. 5
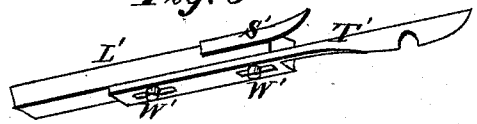
Fig. 6
Witnesses:
Grenville Lewis
M. Church
Inventor;
Levi Scofield
By Hill & Clement
His Attys.

L. SCOFIELD.
CORN-PLANTER.

No. 172,280. Patented Jan. 18, 1876.

Witnesses:
Grenville Lewis
M. Church

Inventor
Levi Scofield
by Hill & Ellsworth
His Attys.

4 Sheets—Sheet 4.
L. SCOFIELD.
CORN-PLANTER.
No. 172,280. Patented Jan. 18, 1876.
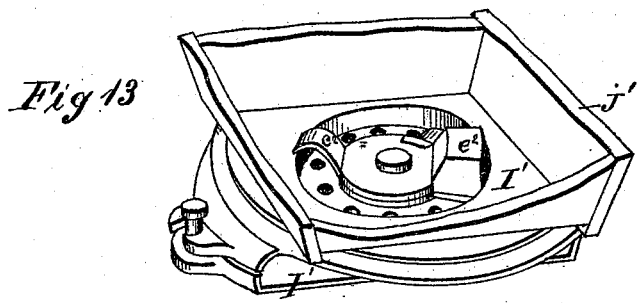
Fig. 13
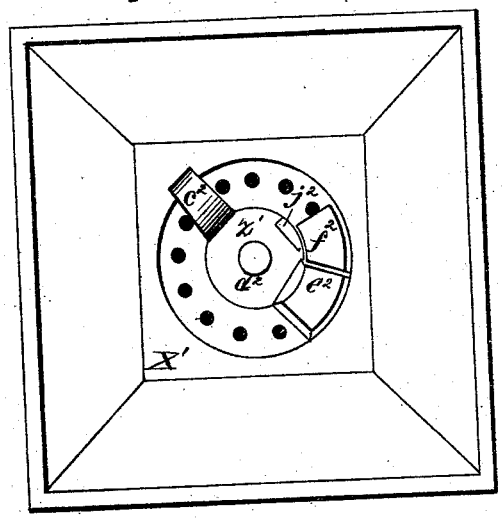
Fig. 14
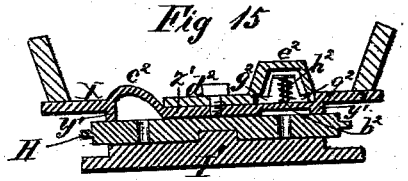
Fig. 15
Fig. 16
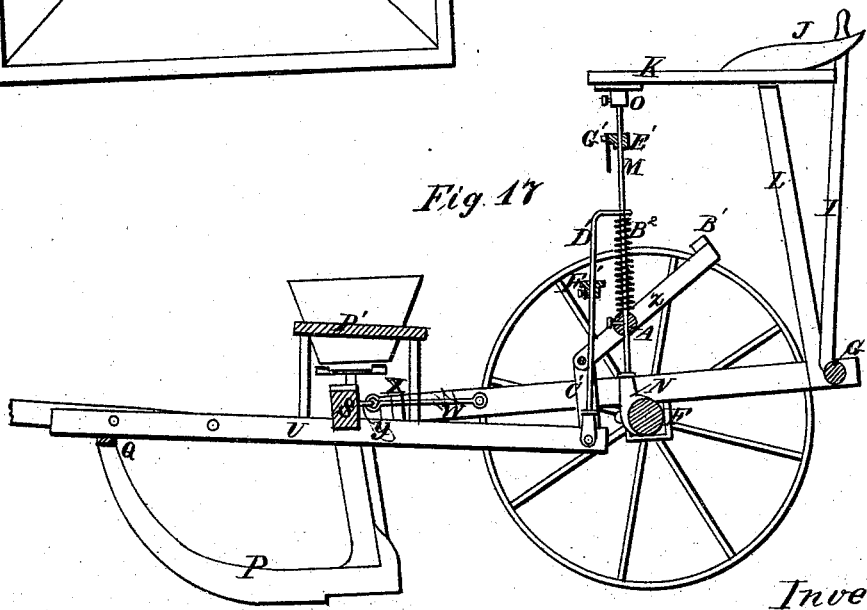
Fig. 17
Witnesses:
Grenville Lewis
M. Church
Inventor
Levi Scofield
By Hill & Ellsworth
His Attys

UNITED STATES PATENT OFFICE

LEVI SCOFIELD, OF GRAND HAVEN, MICHIGAN, ASSIGNOR OF ONE-HALF HIS RIGHT TO JUSTIN B. WAIT, OF SAME PLACE.

IMPROVEMENT IN CORN-PLANTERS.

Specification forming part of Letters Patent No. 172,280, dated January 18, 1876; application filed September 20, 1875.

CASE B.

*To all whom it may concern:*

Be it known that I, LEVI SCOFIELD, of Grand Haven, in the county of Ottawa and State of Michigan, have invented certain Improvements in Corn-Planters; and I do hereby declare the following to be a full and exact description of the same, reference being had to the accompanying drawings, forming part of this specification, in which—

Figure 1:
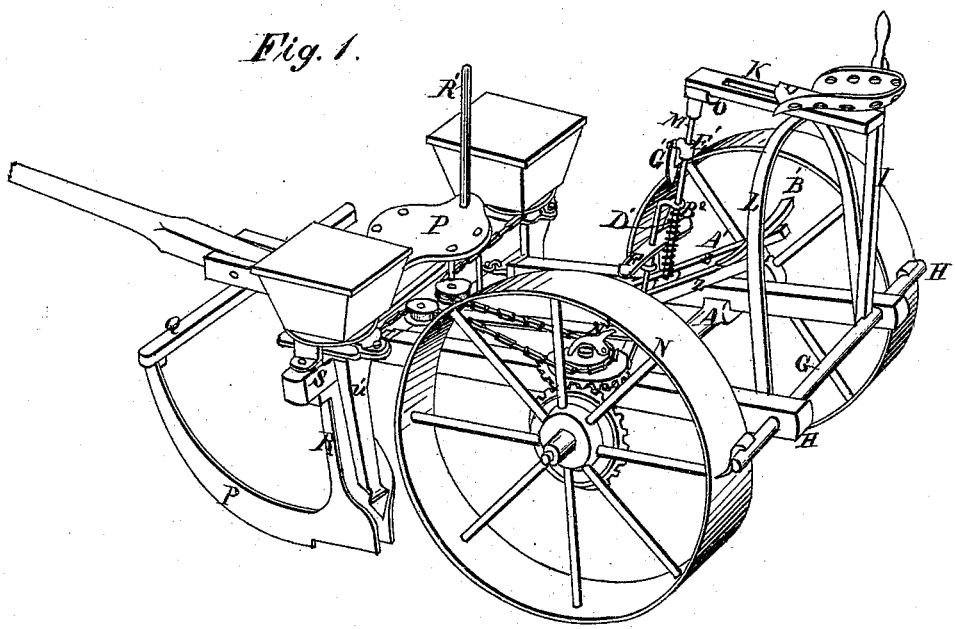
Figure 2:
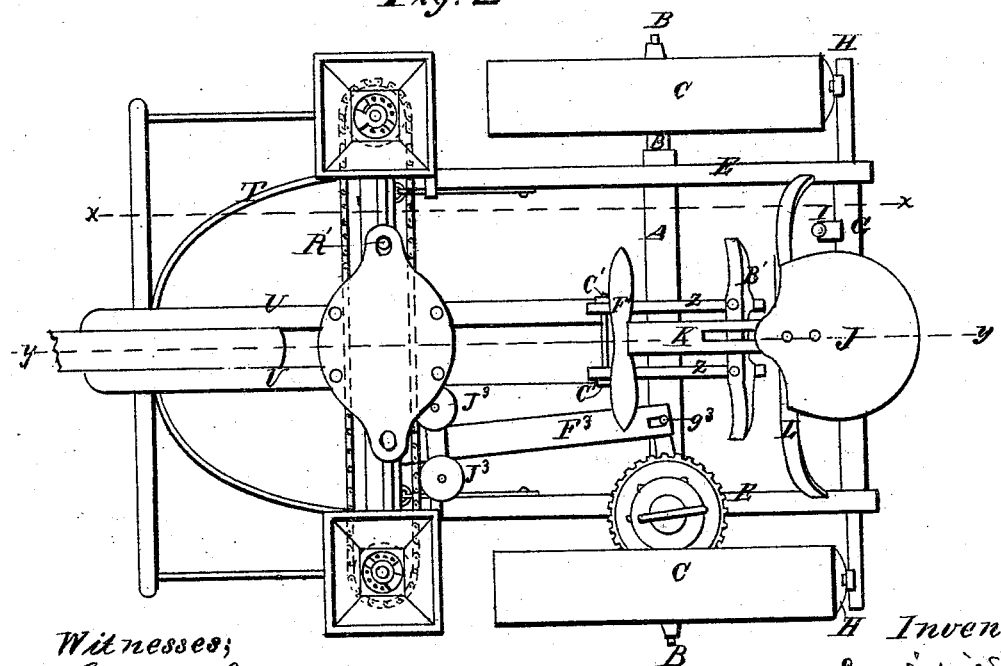
Figure 7:
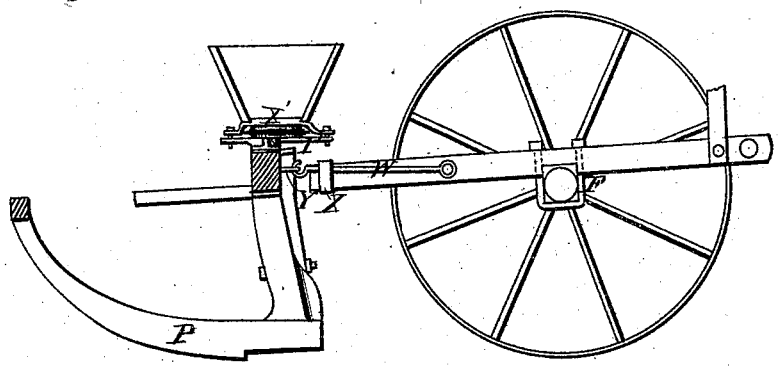
Figure 8:
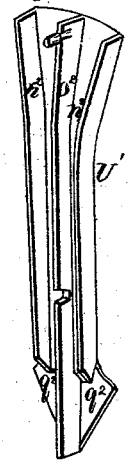
Figure 9:
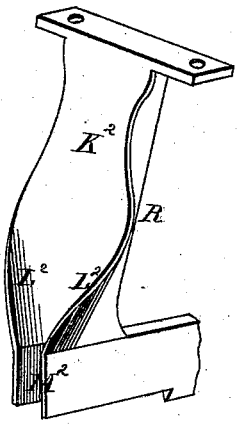
Figure 10:
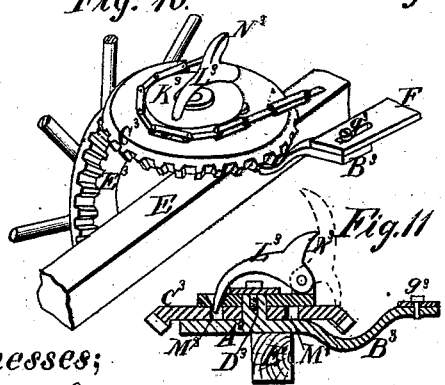
Figure 11:
Figure 12:
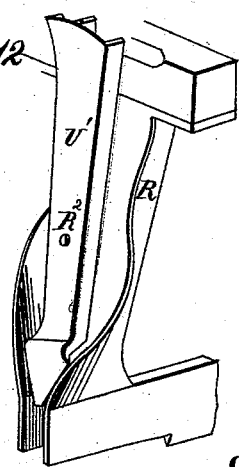

Figure 1, Sheet 1, is a perspective view of a corn-planter with my improvements. Fig. 2, Sheet 1, is a top-plan view, showing the planter arranged for check-row planting. Fig. 3, Sheet 2, is a top-plan view, showing it arranged for continuous operation as a drill. Fig. 4, Sheet 2, is a top-plan view of the runner-beam, with the hoppers and attendant's seat removed to show the seed-plates and sliding bar. Fig. 5, Sheet 2, is a sectional view, showing the means for connecting the sliding bar to the seed-conductors. Fig. 6, Sheet 2, is a perspective view of the sliding bar, showing the adjustability of the brackets for operating the seed-conductors. Fig. 7, Sheet 3, is a longitudinal section of the planter, taken in the line $x\ x$, Fig. 2, and looking toward the right-hand supporting-wheel. Fig. 8, Sheet 3, is a perspective view of the seed-conductors detached from the seed-tube. Fig. 9, Sheet 3, is a perspective view of the detached seed-tube. Fig. 10, Sheet 3, is a perspective view of the devices for operating the driving-chain from one of the supporting-wheels. Fig. 11, Sheet 3, is a sectional view of the same. Fig. 12, Sheet 3, is a perspective view of the seed tube and conductor combined. Fig. 13, Sheet 4, is a perspective view of the cut-off. Fig. 14, Sheet 4, is a top-plan view thereof. Fig. 15, Sheet 4, is a longitudinal section of the same, showing its interior construction. Fig. 16, Sheet 4, is a view of the cut-off inverted; and Fig. 17, Sheet 4, a longitudinal section taken in the line $x\ x$, Fig. 2.

Similar letters of reference in the accompanying drawings denote the same parts.

My invention has for its object to convert into an automatic drill the check-row corn-planter for which Letters Patent of the United States No. 162,106 were granted to me April 13, 1875; and to this end the invention consists, first, in driving the seed-plates from gearing connected with one of the supporting-wheels of the machine by means of a chain or belt passing around both seed-plates, and round a toothed plate mounted upon the gearing. It further consists in constructing and arranging these devices so that the runners and seed-tubes can be raised and lowered, and the planter conform to the undulations of the ground, without binding or cramping the various parts; and, lastly, in the construction of the toothed driving-plate and its combination with the gearing, by which the seed-plates are adapted to be thrown into and out of operation, as I will presently describe.

In the accompanying drawings, A is the axle of the machine, composed of wood, and provided with wrought-iron skeins B, driven into their ends to receive the supporting-wheels C. The ends of the wooden axle are strengthened by the metal bands D, and the squared portions next the ends are mortised to receive the two side bars E E, which are held therein by the staples or loops F. G is a rod passing through the rear ends of the side pieces to complete the main frame of the machine, and form a support at its ends for the wheel-scrapers H. It is constructed with shoulders between the side pieces to prevent the latter from being moved inward or toward each other, and is also adapted to turn in its bearings to operate the scrapers when the lever I is moved by the driver on the seat J.

By this construction the main frame of the machine is greatly simplified, lightened, and cheapened, while its various parts are united in the strongest possible manner.

The driver's seat is mounted upon a slotted bar, K, which is supported at or near its rear end by a bow or bent bar, L, connected to the side piece of the frame, and at its front end by a leg, M, affixed to the axle of the machine. The seat is attached to the slotted bar by means of a bolt and nut, so as to be moved back and forth, for the purpose of adjusting the position of the driver to balance the machine. The front leg of the seat is connected to the axle of the machine by being stepped into a socket, N, bolted or screwed to the front side of the axle, and its upper end is held by a clamping-screw within a metal socket, O, affixed to the under side of the seat-bar. P are the runners or colters, connected at their front ends by a cross-bar, Q, and at their rear ends by the seed-tubes R and main beam S. The cross-bar and beam are strengthened and supported from each other by the curved brace T, and are connected centrally by the parallel hounds U, which carry the draft-pole of the machine between their forward ends. The runners and their attachments are connected to the side bars of the main frame by long links or eyebolts W, pivoted to either side of the bars some distance from the front ends thereof, and, after passing through loops X on the front of the bars, are jointed to the back of the main beam by staples or short eyebolts Y. This arrangement forms a compound coupling-joint by which the runners and seeding devices are permitted to rise and fall through the vertical movements of the long eyebolts within the loops X, and to turn or swing freely by the connection of the eyebolts with the beam-staples.

The joint thus formed prevents the parts from being cramped or strained, and enables the runners to conform readily to inequalities in the surface of the ground, and consequently insures the planting of the seed at a uniform depth.

Z are levers hung upon the ends of a bar, $A^1$, which is adapted for adjustment upon the front seat-leg. Their rear lower ends are provided with a foot-bar, $B^1$, and their forward ends are pivoted to the hounds by short bars $C^1$. When it is desired to raise the runners wholly or partially out of the ground, the driver presses down the bar $B^1$ with his feet, lifting the hounds, and with them the runners and seeding devices. Upon releasing the levers, the runners drop down again by their own gravity. The depth at which the runners shall operate is determined by adjusting the pivot-bar $A^1$ upon the seat-leg. The runners are farther connected to the rear portion or frame of the planter by a rod, $D^1$, pivoted at its lower end between the hounds, and arranged to slide upon the front seat-leg between an adjustable collar, $E^1$, and a coiled spring, $B^2$, above the pivot-bar $A^1$.

When the planter is in operation the upper end of the reach rests upon the coiled spring, and therefore causes the runners to bear upon the ground with a yielding pressure. The sudden shocks to which the machine is subjected in passing over the ground are taken up by this spring, in order to prevent injury to the seeding mechanism.

It will be observed that when the lifting-levers are adjusted on the seat-leg, to raise or lower the runners, the same relative distance is preserved between the upper end of the reach and the pivot-bar $A^1$. This arrangement insures uniformity in the action of the spring, whether the runners are set for deep or shallow planting.

$F^1$ is an adjustable foot-bar on the reach-rod, by which the driver is enabled to press down the runners with his whole weight in passing over hard or very uneven ground. The adjustability of the foot-bar also adapts it for use to suit drivers of different stature. $G'$ is a catch pivoted to the adjustable collar $E^1$, so that when the runners are raised out of the ground by pressure upon the foot-bar $B^1$ it shall automatically engage with the reach-rod and hold the runners in an elevation position. To release the runners it is only necessary to depress their foot-levers and swing back the catch by hand.

The seed-plates $H^1$, to which the second part of my invention relates, are pivoted upon the plates $I^1$ at the ends of the runner-beam, and covered by the hoppers $J^1$. The plates are provided with a number of teeth to enter the open links of a chain, $K^1$, by which such plates are connected. $L^1$ is a bar adapted to slide longitudinally upon the runner-beam within guides $M^1 M^1$, and provided with two lateral arms, $N^1 N^1$, extending under the chain to support it in a horizontal position. The ends of the arms are inclined upward in opposite directions to form catches $O^2$, for engaging the chain-links, and are further formed with guards $O^1 O^1$, to prevent the chain from slipping laterally. $P'$ is a seat supported upon the hounds of the planter immediately over the runner-beam and chain, and provided with an opening, $Q'$, at each end, through one of which a pointed bar or hand-lever, $R'$, is placed to enter an opening or recess in the top of the bar $L^1$, as shown. An attendant occupying this seat, by moving the bar $L^1$ to and fro, (the openings $O^1$ being large enough to permit this movement,) causes the bar $L^1$ to reciprocate upon the runner-beam, and the catches $O^2$ to bear alternately against the ends of the open links upon the lower side of the chain.

This operation imparts an intermittent movement to the chain in one direction, and, consequently, an intermittent rotation to the seed-plates. While the catch upon one side is moving the chain the depressed portion of the opposite catch causes the latter to pass freely under the links of the chain without moving them. By this arrangement the seed-plates are moved the distance of one opening at each movement of the chain to discharge the seed into the seed-tubes.

$S' S'$ are stops attached to or formed upon the ends of the sliding bar $L^1$. As the sliding bar is operated to move the chain these stops are alternately thrown within the path of the seed-plates, where they come in contact with the teeth thereof, and prevent the momentum of the plates from carrying their seed-chambers past the discharge-apertures in the base-plates I'. T' T' are notched brackets for communicating motion from the sliding bar to the seed-conductors U', which are pivoted to the backs of the seed-tubes R. These brackets are adapted for adjustment on the sliding bar by means of slots and set-screws W' for the purpose of compensating for any variations in the castings forming the different parts of the seeding devices, and thereby facilitating the fitting of parts together in setting up the machine. The metal plates X', to which the hoppers are secured, are each formed with a large circular opening in the center, surrounded on the under side of the plate by a projecting flange, Y', which rests upon the seed-plate beneath with close contact. A bar, Z', extends diametrically across the opening to form a support for the seed cut-off. Its center is enlarged somewhat, and, together with the arm $b^2$, bears upon the seed-plate, while the opposite arm $c^2$ is curved upward for the passage of the seed beneath it. To this central support is screwed a plate, $d^2$, formed with an inverted cup, $e^2$, at one end, which rests upon the arm $c^2$ of the bar, and within this cup the curved cut-off $f^2$ is pivoted by means of the trunnions $g^2$, so that its longest arm shall project laterally outward and downward over one of the chambers in the seed-plates, as shown. A spring, $h^2$, held within the cup by the pins $i^2$, bears up the short arm of the cut-off, and, consequently, presses its long arm down upon the seed-plate with a yielding pressure, so that while it acts as a cut-off for the corn in the chambers of the seed-plate it shall yield somewhat to prevent the seed from being broken or crushed as the plate is rotated. To prevent the plate $d^2$ from turning, one side is notched slightly to receive an upward projection, $j^2$, on its supporting-plate, as shown in Fig. 14. The metal plates X' and the plates I' are open upon opposite sides for the passage of the chain, and to expose the edges of the seed-plates and chain for the purpose of observing their operation and facilitating repairs, changes, &c.

The devices for discharging the seed into the ground, and which constitute the third part of my invention, are the pivoted seed-conductor $U^1$, already referred to, and the seed-tube R. The latter is formed by a flat plate, $K^2$, secured to and constituting the back of the runner-shank, and bent inward at its lower end, so as to form two curved side wings, $L^2$, extending upward about one-half the length of the shank. The lower ends of these wings are squared and united to the runners, so as to form the open-backed base or foot $M^2$ of the tubes, as shown. The seed-conductors are each constructed with an open face, which is divided into two longitudinal chambers, $n^2$, by the central rib $o^2$, which, at the foot, projects beyond the sides $n^2$ of the conductor, and divides its triangular or diamond shaped foot into two compartments, $q^2$, which I designate as the lower drop. The conductors are pivoted to the seed tubes or plates, as shown at $R^2$, with the parallel channels next the winged plates, and with the angular base between the widest portion of the wings.

When the machine is in operation the sliding bar $L^1$ oscillates the seed-conductors upon their pivots in conformity with the rotation of the seed-plates, so that the seed-channels in each conductor shall alternately receive the seed and conduct it to the ground. The beveled edges of the lower drop are alternately thrown against the side wings of the seed-tube, and therefore hold the seed-compartments $q^2$ in plain view of the driver a sufficient length of time to enable him to see their contents and determine the quantity of seed planted in each hill or drill. The position of the seed-conductors in holding the seed in view on one side the seed-tube produces a large opening upon the opposite side—that is to say, an opening formed by the unoccupied compartment $q^2$ and the adjoining side wing, which effectually prevents the accumulation of dirt to stop or otherwise affect the operation of dropping devices. The curved side wings also serve to exclude the dirt from the conductor and seed-tube, as will be readily seen.

The machine thus far described constitutes the subject of my patent of April 13, 1875; and my present improvements, which I will now proceed to set forth, consist in the method and mechanical appliances for converting such machine into a drill or self-dropper, as described in the statement of invention herein.

$A^3$ is a flat plate, bolted to one of the side pieces E of the frame immediately over the axle, and provided with a lateral arm, $B^3$, extending horizontally inward. $C^3$ is a miter-wheel, mounted upon a stud, $D^3$, of the plate, so as to engage with a corresponding gear, $E^3$, upon the hub of the supporting-wheel.

$F^3$ is a thin metal bar slotted at its rear end to fit over a pin, $g^3$, on the lateral arm $B^3$, and connected at its front end to the main or runner beam S. To connect the front end of this bar to the beam, and put the automatic devices in position for operation, the hand-lever $R^1$ is removed, and the sliding bar $L^1$ moved along the beam until the opening for the point of the hand-lever coincides with the slot in the front end of the thin bar, a hole in the beam immediately beneath it, and a washer, $H^3$, placed between the beam and bar, as shown. A bolt, $I^3$, is then placed in these various openings to hold the sliding bar in place, and prevent its stops S' from coming in contact with the rotating seed-plates.

In order to adapt the driving-chain to the automatic devices it is lengthened by the addition of a short piece of chain, so as to pass round the seeding-plates, thence between the grooved rollers $J^3$ at the front end of the thin bar, and back round the toothed driving-plate $K^3$, which is mounted upon the stud of the miter-wheel $C^3$, as shown. To lengthen or shorten the chain in changing the machine from a check-row to a drill-planter, or vice versa, two links at any point are united by a screw, which is readily removed for the changes stated. L³ is a curved dog pivoted at one end eccentrically to the driving-plate, and extending across the latter, so that its opposite point shall project through a hole therein, and engage with one or more of the holes M³ in the miter-wheel. This pivoted dog serves to lock the driving-plate and miter-wheel together for operating the seed-plates through the medium of the driving-chain. To disconnect the feed-plate and miter-wheel, and throw the seeding devices out of operation, the driver presses with his foot upon the toe N³ of the dog, and lifts its point out of the miter-wheel. The dog then remains in an upright position, as shown by dotted lines, Fig. 11, until thrown down again to automatically lock the feed-plate and miter-wheel together.

When the machine is in motion the operation of the seeding devices is continuous, of course, being driven from the gear-wheel E³, as above described. The spaces between the dropped seed are regulated by arranging different numbers of holes in the seed-plates, as will be readily understood.

The slots in the ends of the thin bar F³ permit it to slide back and forth slightly when the runners are raised and lowered to prevent cramping and binding as the machine works over uneven ground.

The rising and falling movement of the runner tightens and loosens the chain, and would prevent its uniform operation, were it not for the slot in the rear end of the thin pulley-bar, which permits the latter to move backward and forward as the runners are moved, and therefore preserves the tension of the chain. This bar should also be flexible, to adapt it more effectually to the movement of the runner.

Instead of using a chain for operating the seed-plates, a belt of any kind may be employed by forming the plates with grooves instead of peripheral teeth; but in a combined check-row and drill planter I prefer, as a matter of economy, to use the same chain that is used in the check-row planter alone.

The quantity of seed to be planted is regulated by changing the seed-plates, as described in my patent of November 21, 1871.

I claim as my invention—

1. The seeding-plates, operated from gearing connected with one of the driving-wheels by means of a chain or belt arranged to pass around both plates and a toothed plate connected with the gearing for the purpose of operating the machine as a drill, substantially as described.

2. In a seeding-machine, the thin bar F³, adapted for longitudinal movement at either end upon its supports, to preserve the tension of the driving-chain when the runners of the machine are raised and lowered, substantially as described, for the purpose specified.

3. In a seeding-machine, the bar F³, provided with guide-pulleys for the driving-chain, and made thin and flexible to adapt it to the movement of the runners, substantially as described.

4. The thin adjustable bar F³, having pulleys J³, combined with the seeding devices and main frame, to guide the driving-chain, and permit the seeding device to conform to the undulations of the ground without cramping or binding the joints or connections of the machine, substantially as described.

5. In a seeding-machine, the armed plate A³, constructed as described, for supporting the miter-wheel C³, the toothed driving-plate, and the rear end of the bar F³, substantially as described.

6. In a seeding-machine, the perforated toothed driving-plate K³, mounted upon the vertical stud of the miter-wheel C³, as herein set forth, for the purpose specified.

7. In a seeding-machine, the pivoted dog, combined with the perforated miter-wheel and driving-plate for locking the two together, substantially as described, for the purpose specified.

8. In a seeding-machine, the dog L³, provided with the toe N³, by which it is disengaged from the driving-plate and miter-wheel, and held in an upright position, substantially as described.

9. The combination of the miter-wheel, the adjustable driving-plate, the guide, pulley-plate, and the driving-chain, with the supporting-wheel and seeding-plates of a corn-planter, substantially as described, for the purpose of converting the machine into an automatic drill, as specified.

10. The seed-plates and driving-chain, in combination with a device, I³, for locking the sliding bar L to the runner-beam, and holding the stops S' out of contact with the seed-plate, substantially as described.

LEVI SCOFIELD.

Witnesses:
J. A. LEGGATT,
E. G. PARSONS.